United States Patent [19]
Wycoff et al.

[11] Patent Number: 5,384,564
[45] Date of Patent: Jan. 24, 1995

[54] BATTERY SAVING ARRANGEMENT FOR SELECTIVELY ADDRESSABLE, PORTABLE RECEIVERS

[75] Inventors: Keith H. Wycoff, 1205 N. Tyler St., Lexington, Nebr. 68850; William H. Dittmer, Lexington, Nebr.

[73] Assignee: Keith H. Wycoff, Lexington, Nebr.

[21] Appl. No.: 824,592

[22] Filed: Jan. 23, 1992

[51] Int. Cl.⁶ .............................................. H04B 1/16
[52] U.S. Cl. ........................... 340/825.44; 340/825.48; 455/38.3; 455/343
[58] Field of Search ...................... 340/825.44, 825.48, 340/311.1; 455/38.3, 343, 228

[56] References Cited

U.S. PATENT DOCUMENTS

| | | | |
|---|---|---|---|
| 3,783,384 | 1/1974 | Wycoff . | |
| 4,398,192 | 8/1983 | Moore et al. | 340/825.44 |
| 4,419,765 | 12/1983 | Wycoff | 455/343 |
| 4,506,386 | 3/1985 | Ichikawa et al. | 455/343 |
| 4,523,332 | 6/1985 | Mori | 340/825.44 |
| 4,652,875 | 3/1987 | Waki | 340/825.44 |
| 4,668,949 | 5/1987 | Akahori | 340/825.47 |
| 4,804,954 | 2/1989 | Macnak et al. | 340/825.44 |
| 4,996,526 | 2/1991 | DeLuca | 340/825.44 |
| 5,077,758 | 12/1991 | DeLuca et al. | 375/95 |
| 5,109,530 | 4/1992 | Stengel | 455/38.3 |
| 5,144,296 | 9/1992 | DeLuca et al. | 340/825.44 |
| 5,227,777 | 7/1993 | Sato et al. | 340/825.44 |
| 5,233,344 | 8/1992 | Ohga | 340/825.44 |

OTHER PUBLICATIONS

Swedish specification entitled "Paging Receiver For The Swedish Public Radio Paging System," No. 76-16560-2E, dated Apr. 22, 1976.

Primary Examiner—Michael Horabik
Attorney, Agent, or Firm—Emrich & Ditdhmar

[57] ABSTRACT

A pager receiver for receiving signals transmitted in the POCSAG code format which includes a preamble signal followed by at least one batch, the pager receiver including a preamble absence detector circuit for detecting whether or not a received signal includes the preamble and a power saving circuit responsive to the preamble absence detector circuit for deactivating signal processing circuits of the pager receiver as soon as detection is made that the received signal does not include the preamble signal. The power saving circuit causes the signal processing circuits of the pager receiver to operate in a low power mode in which the signal processing circuits are deactivated for an extended period of time, such as for 256 seconds, when a received signal includes an inverted synchronizing signal following the last codeword transmitted, the signal processing circuits being maintained in the low power mode in response to a received signal which includes the preamble signal followed immediately by an inverted synchronizing signal.

38 Claims, 7 Drawing Sheets

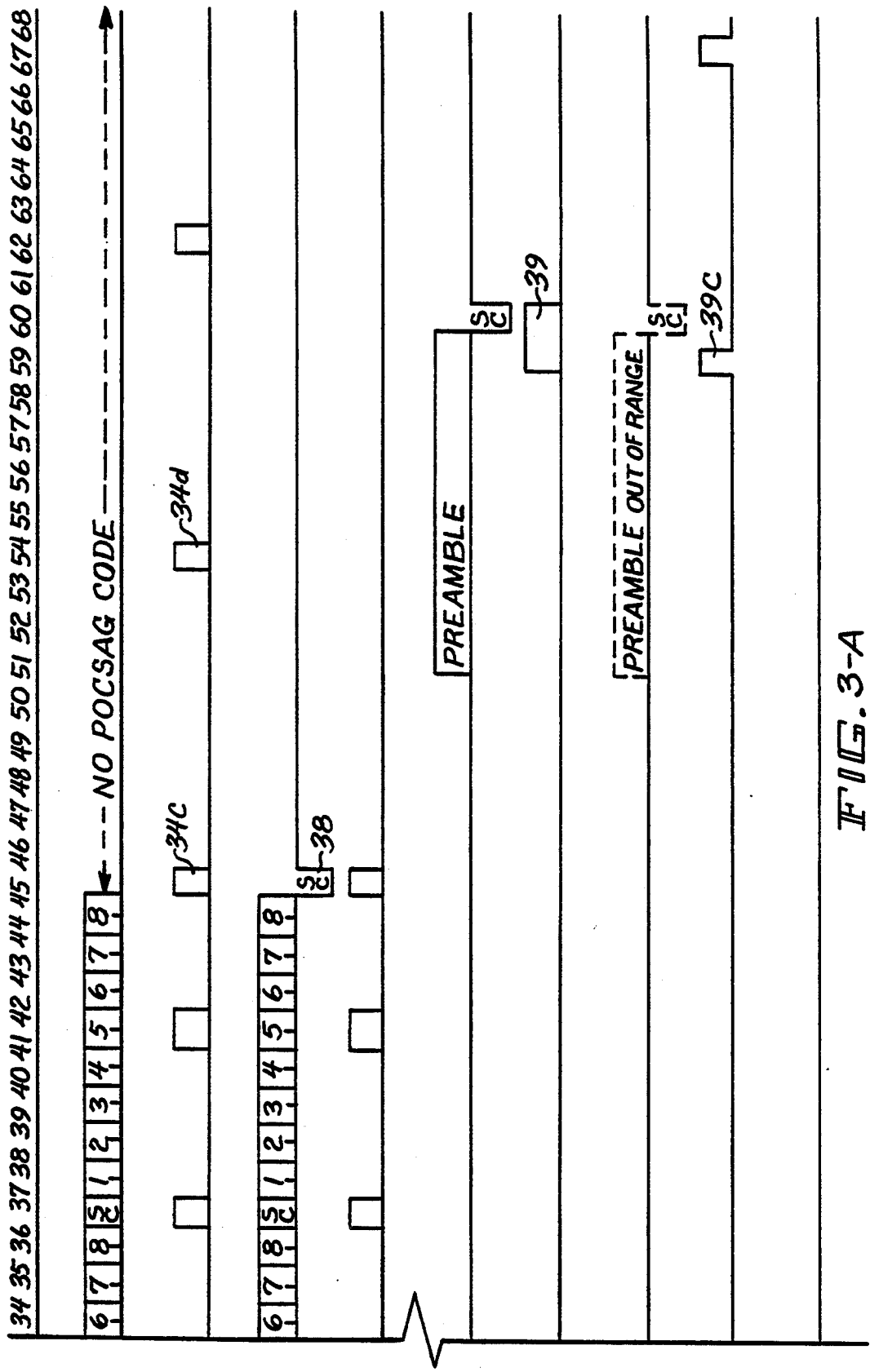
FIG. 3-A

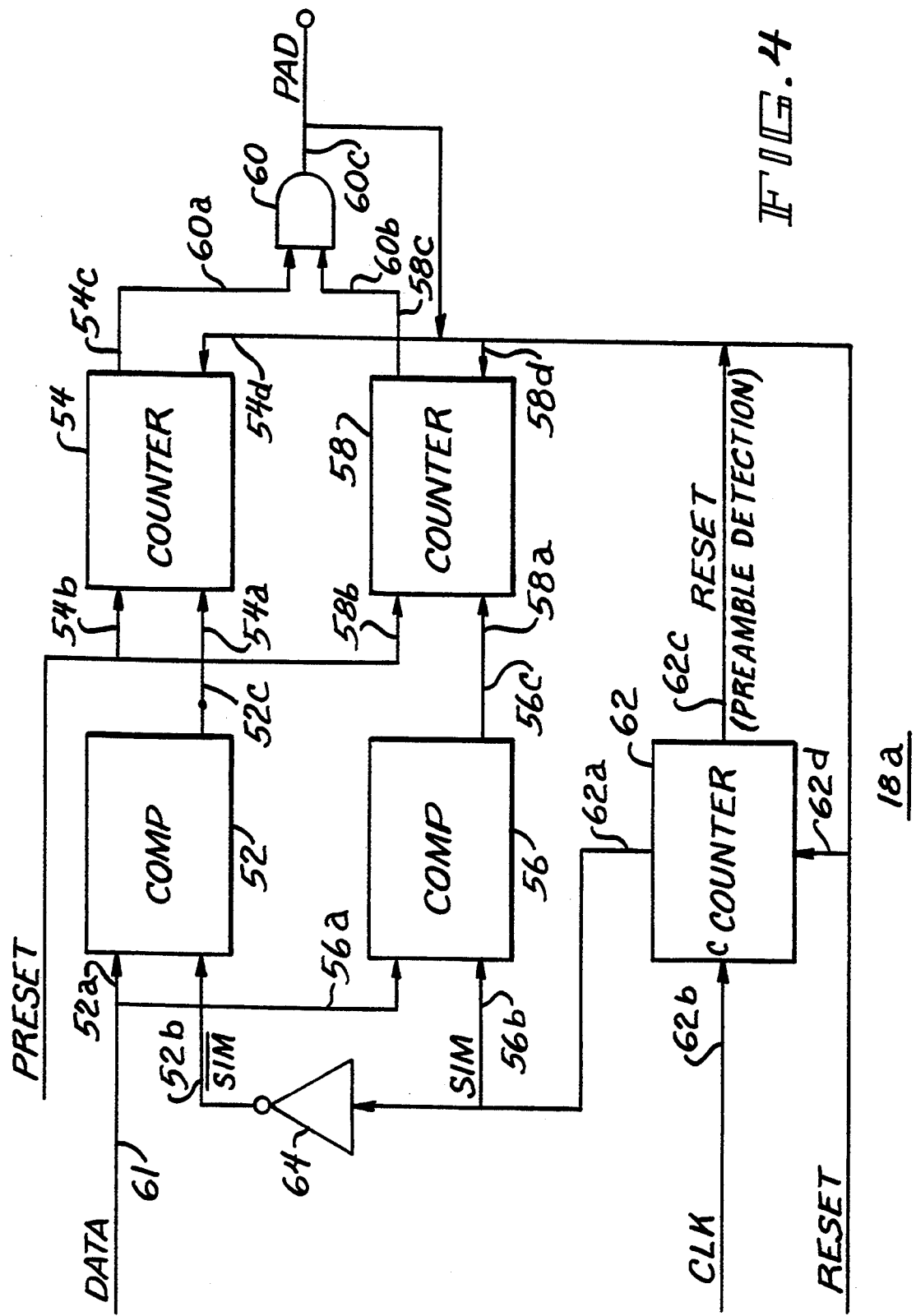

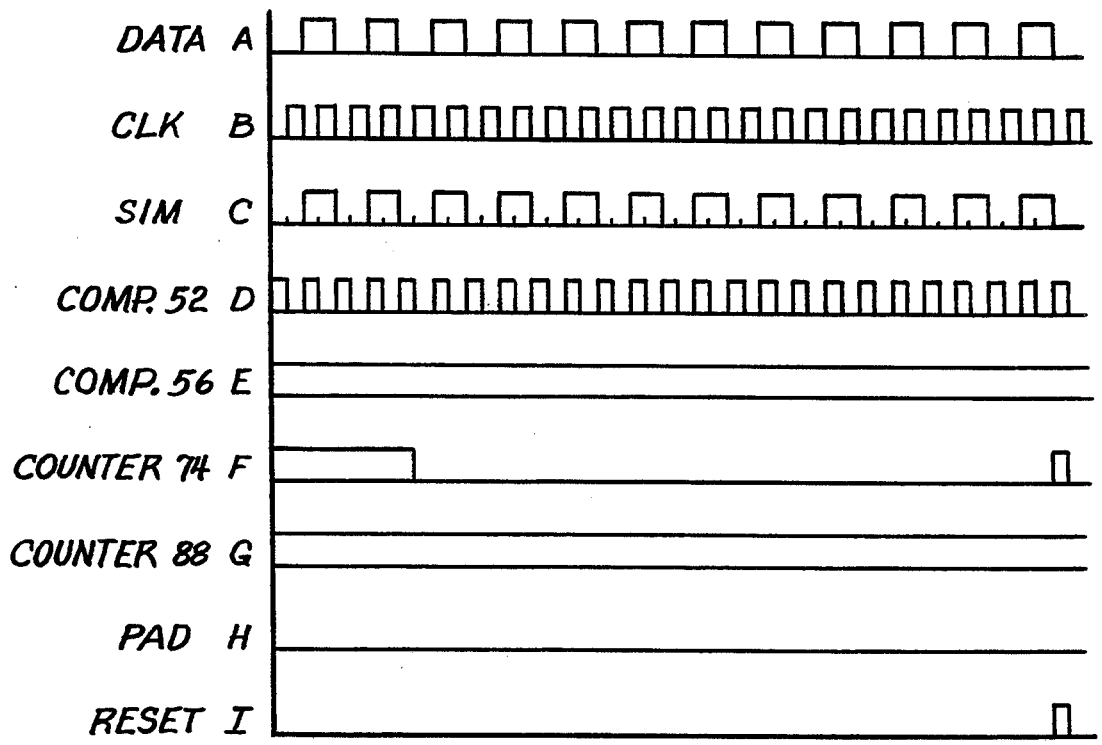
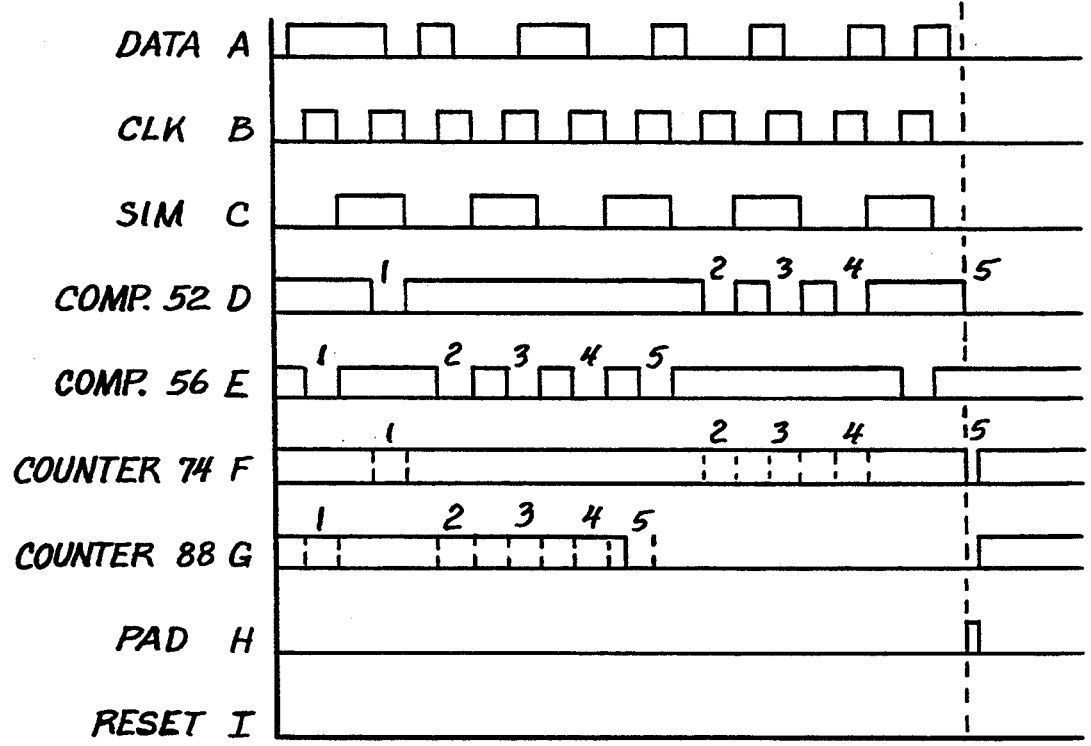

BATTERY SAVING ARRANGEMENT FOR SELECTIVELY ADDRESSABLE, PORTABLE RECEIVERS

BACKGROUND OF THE INVENTION

This invention relates to communication systems including selectively addressable battery-powered devices, such as personal pager receivers, and more particularly to an arrangement for minimizing power usage in such devices.

Various battery saving arrangements have been proposed for portable, selectively addressable battery-powered devices, such as personal pager receivers. In most communication systems employing such devices, battery drain is minimized by operating the pager receiver in a plurality of modes, typically including a signal seeking mode in which minimum power is applied to the receiver detecting circuits for the minimum amount of time necessary to detect the start of a transmission; a signal verification mode in which power is applied only to those portions of the receiver circuits that operate to verify that the detected transmission is a valid transmission and to determine if the transmission includes the address code that is assigned to the receiver; and an active mode in which full power is applied to the receiver circuits to operate devices that produce an audible alarm, a visual display, and the like, for indicating that a valid paging signal has been received. The ability of the pager receiver to function in the proper mode is enhanced by the nature of the transmission.

One transmission code format which has been adopted as the international standard for use in radio paging systems was developed by the British Post Office Code Standardization Advisory Group. The code format is commonly referred to as the POCSAG code. The POCSAG code comprises a preamble followed by a plurality of batches of complete codewords. The preamble is a pattern of bit reversals 101010 . . . repeated for a period of at least 576 bits. Each batch comprises a thirty-two bit sync codeword which is followed by eight frames of address and/or message, each frame containing two thirty-two bit codewords.

In the battery saving mode, power is applied to the signal detecting and decoding circuits of the pager receiver circuits for a predetermined amount of time and a predetermined number of bits are sampled. The amount of on time with this method is inversely related to the probability of false preamble signal detection. The fixed on time mode is easy to implement. However, the minimum number of bits that must be sampled in order to insure (with a probability exceeding 0.9998) against false preamble detection when $N=2$ is twenty-one. N is the number of bits that have been received in error due to noise. This requires at least 41 ms of on time. This provides an off:on ratio of 24.4:1.

Therefore, it would be desirable to have an arrangement which provides a battery saving mode which is characterized by a substantially higher off:on ratio than that previously provided by conventional POCSAG battery saving modes, and which arrangement is readily implemented and is compatible with existing POCSAG systems.

SUMMARY OF THE INVENTION

It is therefore an object of the present invention to provide an improved arrangement for minimizing power usage in portable, selectively addressable devices, such as pager receivers.

Another object of the invention is to provide a battery saving arrangement for pager receivers which is characterized by a substantially higher off:on ratio than has been attainable previously, and which is compatible with normal POCSAG battery saving mode operation.

A further object of the invention is to provide an arrangement for maintaining pager receivers operating in a low power idle mode for extended durations of time for periods of minimum signal transmissions.

These and other objects are achieved by the present invention which provides a selectively addressable receiver having signal processing circuits for receiving an interrogation signal including a preamble signal having a predetermined coding followed by at least one codeword, a power saving circuit for periodically applying a supply voltage to said signal processing circuits of the receiver, and preamble absence detecting means including first signal detecting circuit means responsive to a received signal to produce a first output signal whenever said received signal fails to have the predetermined code of said preamble signal, second signal detecting circuit means responsive to said received signal to produce a second output signal whenever said received signal fails to have the predetermined coding of said preamble signal, signal combining circuit means responsive to said first and second output signals to provide a preamble absence detection signal indicating that the received signal does not include the predetermined coding of said preamble signal, said power saving circuit means responding to said preamble absence detection signal to terminate the supply voltage to said signal processing circuits of the receiver for a predetermined interval of time.

Further in accordance with the invention, there is provided a selectively addressable receiver having signal processing circuits for receiving an interrogation signal including a preamble signal having a predetermined coding followed by a synchronizing signal and a plurality of address signals, the signal processing circuits including synchronizing means, address means, and a power saving circuit including timing means for operating the signal processing circuits in a power saving mode in which the signal processing circuits are activated periodically for a time interval of a predetermined duration for detecting the preamble signal and the synchronizing signal, the synchronizing means being responsive to a synchronizing signal to cause the power saving circuit to deactivate the signal processing circuits and subsequently reactivate the signal processing circuits at a preselected time following the occurrence of the synchronizing signal for enabling the address means to respond to address signals, and comprising the combination of preamble absence detecting means responsive to a received signal for producing a preamble absence detection signal whenever the received signal fails to include the predetermined coding of said preamble signal, the power saving circuit responding to said preamble absence detection signal to deactivate the signal processing circuits of the receiver for a predetermined interval of time, and in the absence of said preamble absence detection signal, the power saving circuit maintaining the signal processing circuits activated for detecting the synchronizing signal, and further synchronizing means responsive to the complement of said synchronizing signal for causing the power saving circuit to deactivate the signal processing circuits of the receiver for an interval of time substantially greater than said predetermined interval of time.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

For the purpose of facilitating and understanding the invention, there is illustrated in the accompanying drawings a preferred embodiment thereof, from an inspection of which, when considered in connection with the following description, the invention, its construction and operation, and many of its advantages will be readily understood and appreciated.

FIGS. 3 and 3A, when arranged side by side, provide a timing diagram illustrating the relationship of signals input to the decoder circuit illustrated in FIG. 2, and the resultant battery saving output under different conditions;

FIG. 4 is a block diagram of the preamble absence detector circuit of the decoder circuit illustrated in FIG.

FIGS. 6 and 7 are timing diagrams illustrating the relationship of signals produced by the preamble absence detector circuit of FIG. 5 under a valid input signal condition and a noise condition, respectively.

DESCRIPTION OF A PREFERRED EMBODIMENT

Figure 1:
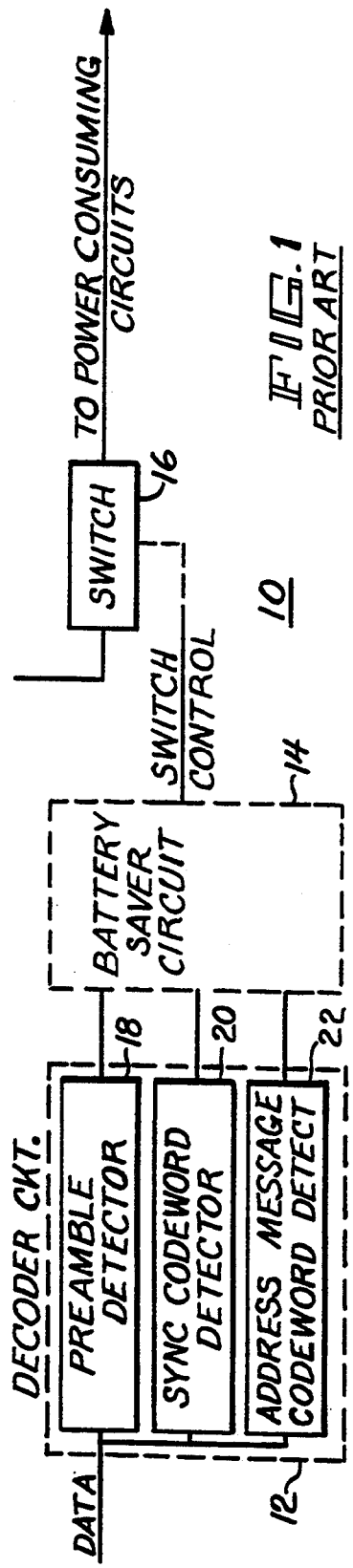
FIG. 1, which is labeled Prior Art, is a block diagram of a decoder circuit and battery saver circuit of a conventional pager receiver.

Referring to FIG. 1, which is labeled Prior Art, there is illustrated a block diagram of the signal transmission decoding and power switching circuit 10 of a conventional pager receiver for a communication system employing the POCSAG code format. In such system, the POCSAG code which is transmitted includes a preamble followed by a plurality of batches of complete code words. The preamble is a pattern of bit reversals 101010 ... repeated for a period of at least 576 bits and transmitted at a rate of 512 bits per second. Each batch includes a thirty-two bit sync codeword followed by eight frames, each containing two, thirty-two bit address and/or message codewords. The address codewords uniquely identify the pager receiver. When a given pager receiver receives its assigned address codeword, that pager receiver is activated to respond to a message codeword transmitted with the associated address codeword to cause the pager receiver to produce a desired response, such as the generation of an audible alarm, a visual display of data in a numerical form, etc.

The circuit 10 includes a decoder circuit 12, battery saver circuit 14, and a power switch 16. The decoder circuit 12 includes a preamble detector circuit 18, a sync codeword detector circuit 20 and an address/message codeword detector circuit 22. Incoming data is applied commonly to the inputs of the detector circuits 18, 20 and 22. Preamble detector circuit 18 processes the preamble portion of the transmitted code. When a valid preamble is detected, the preamble detector circuit 18 provides a control output to the battery saver circuit 14 to cause power to be maintained long enough to detect the sync codeword via sync codeword detector circuit 20. When a valid sync codeword is detected, the sync codeword detector 20 provides a further control output to the battery saver circuit 14 which responsively causes the address/message codeword detector circuit 22 to be enabled in a time slot assigned to the pager receiver. The battery saver circuit 14 also controls the power switch 16 to apply power to power consuming circuits (not shown) of the pager receiver for lengths of time appropriate with the transmission detected. The manner in which conventional pager receivers operate to receive and decode transmissions and to effect appropriate operations as well as the manner in which the conventional circuits operate in battery saver modes, is well known in the art and will not be described in detail herein.

In the normal battery saving mode, which uses a standard on time, power is applied to the signal transmission decoding and power switching circuits 10 for a predetermined amount of time and a predetermined number of bits are sampled. The amount of on time with this method is inversely related to the probability of false preamble signal detection. The fixed on time mode is much easier to implement than the variable on time mode. However, the minimum number of bits that must be sampled to insure (with a probability exceeding 0.9998) against false preamble detection when N=2 is twenty-one. However, nearly all pager receivers which are presently available are designed to sample thirty-two bits. At a 512 bit per second rate, this requires at least 62.5 ms of on time. This provides an off:on ratio of 16:1.

Figure 2:
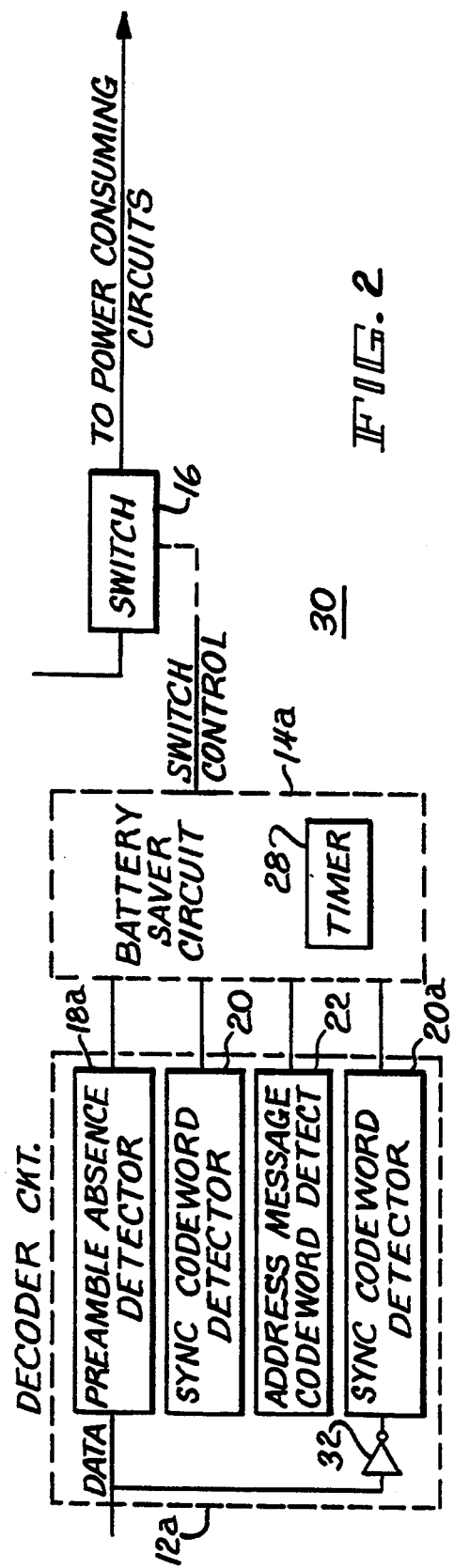
FIG. 2 is a block diagram of an improved decoder circuit for a pager receiver which provides preamble detection, preamble absence detection, sync codeword detection and in accordance with the present invention.

Referring to FIG. 2, there is illustrated a block diagram of signal transmission decoding and power switching circuit 30, including a decoder circuit 12a, a battery saver circuit 14a, and a power switch 16 provided in accordance with the present invention. This signal transmission decoding and power switching circuit 30 provides a battery saving mode in addition to the two battery saving modes obtainable by the conventional circuit illustrated in FIG. 1. The decoder circuit 12a illustrated in FIG. 2, includes a preamble absence detector circuit 18a which includes a preamble detector. Also, the decoder circuit 12a includes an additional sync codeword detector circuit 20a which is identical in structure and function with sync codeword detector circuit 20, but has an associated inverter 32, enabling the decoder circuit 12a to detect the normal sync codeword and the inverse of the sync codeword, hereinafter referred to as the inverted sync codeword. However, operation of the circuit of FIG. 2 is compatible with conventional POCSAG pager receivers.

In accordance with one aspect of the invention, the decoder circuit 12a employs preamble absence detection and causes the pager receiver circuits to be transferred to a power down condition as soon as a determination has been made that the transmission does not include a valid preamble. In most known preamble detection schemes, thirty-two bits (the length of a codeword) are sampled to insure against false preamble detection. The pager receiver circuits are powered down if there are more than N errors. Typically, N=1 in simpler decoders and is seldom more than four in more complex decoders. Accordingly, most decoders require that power be applied for at least 62.5 milliseconds.

The decoder 12a provided by the present invention uses a variable on time. Power is discontinued to the pager receiver circuits as soon as more than N-bits of the transmission of an expected preamble are determined to be in error. If N=1, at least four bits must be sampled to determine preamble absence. The expected on time for N=1 is approximately 10.7 milliseconds, providing an off:on ratio of 93:1. If N=2, at least six bits must be sampled. The expected on time for N=2 is approximately 15.38 milliseconds, providing an off:on ratio of 65:1. If N=4, at least ten bits must be sampled. The expected on time for N=4 is approximately 24.3 milliseconds, providing an off:on ratio of 41:1.

Thus, preamble absence detection provides faster transition to the power down mode than is provided using conventional preamble detection schemes. The manner in which the preamble absence detector circuit 18a of the decoder 12a operates is described in detail hereinbelow with reference to FIGS. 4–7.

The decoder circuit 12a minimizes the "on time" or power up condition of the pager receiver by providing extremely long "off times" through the use of a "slightly" modified POCSAG code format. For example, in one embodiment the off:on ratio provided is 1365:1 which is considerably larger than the off:on ratio of 16:1 which is provided by battery modes normally employed in systems which employ the POCSAG code format. Specifically, an inverted sync codeword is transmitted at the end of the last batch transmitted. Upon detection of the inverted sync codeword, the pager receiver is transferred to a power down mode for an extended period of time, for example, 256 seconds. At the end of such time interval, another "slightly" modified transmission of the POCSAG code may be effected, and the cycle is repeated.

In accordance with the conventional POCSAG code format, the sync codeword is:

01111100110100100001010111011000

In accordance with one aspect of the present invention each bit of the sync codeword is inverted and transmitted at the end of the last batch as:

10000011001011011110101000100111

The use of the modified POCSAG code including an inverted sync word enables the pager receivers to be turned off for a predetermined amount of time under conditions of light channel usage when certain conditions are met as will be shown. For purposes of illustration of the invention, this predetermined amount of time is set equal to 256 seconds. However, other durations for the turn off time period can be used as a function of application, type of battery used, and pager receiver power requirements.

Figure 8:
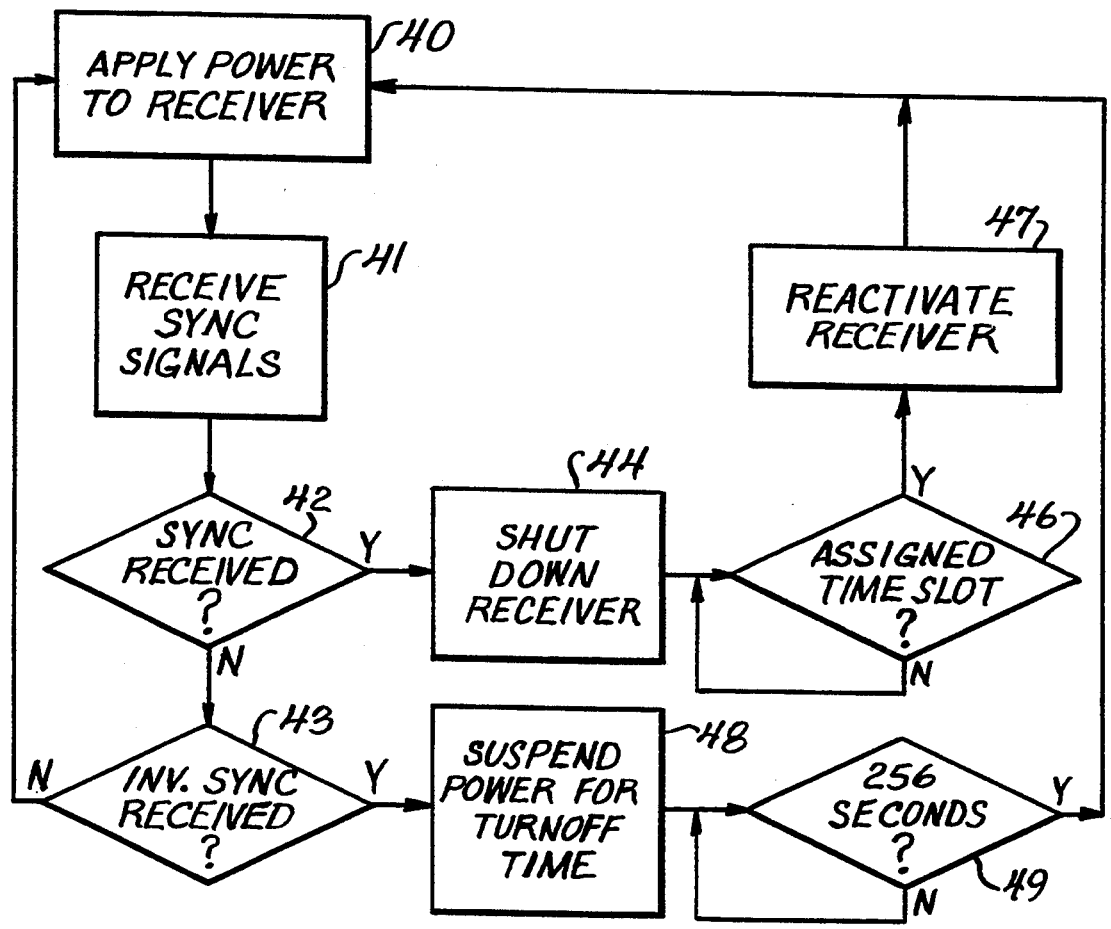
FIG. 8 is a process flow chart inllustrating a method for providing a battery saving function for a battery powered pager receiver including the decoder circuit of FIG. 2.

Referring to FIG. 2, the battery saver circuit 14a includes an internal timer 28 which periodically, typically at a one second rate, generates a battery saver pulse of a predetermined, but extendable duration. In this first mode of battery saving, the on time is typically 62.5 milliseconds. The battery saver pulse activates the preamble absence detector circuit 18a to process a received transmission. If a preamble is detected, the preamble absence detector circuit 18a provides an output to the battery saver circuit 14a to extend the duration of the battery saver pulse to maintain power to the detector receiver circuits for a short "enable time" (FIG. 8, block 40). During this "enable time", decoder circuit 12a determines via the sync codeword detector circuit 20, or the inverted sync codeword detector circuit 20a, whether or not the incoming data includes sync codeword, or an inverted sync codeword (FIG. 8, block 44). If a sync codeword is detected (FIG. 8, block 42), the sync codeword detector circuit 20 provides an output which enables the battery saver circuit to begin operation in the second mode of battery saving as in conventional pager receivers (FIG. 8, block 44), in which the pager receiver shuts down and is reactivated in its assigned time slot (FIG. 8, block 46) for detecting address and message codewords via address/message codeword detector circuit 22 in a conventional manner (FIG. 8, block 47).

If an inverted sync codeword is detected by the inverted sync codeword detector circuit 20a (FIG. 8, block 43) indicative of the end of a transmission, the inverted sync codeword detector circuit 20a provides an output which enables the battery saver circuit 14a to discontinue power to the pager receiver circuits (FIG. 8, block 48) for the turn off time interval which is 256 seconds in duration (FIG. 8, block 49). At the end of that time interval, the preamble absence detector circuit 18a is enabled to respond to an incoming transmission. If message information is being transmitted, the pager receiver will revert to operation in the first battery saving mode to detect the preamble and sync codeword and to then begin operation in the second battery saving mode, the pager receiver being powered down until its assigned time slot. On the other hand, if the modified POCSAG code format is being transmitted, the pager receiver maintains operation in the third battery saving mode and power is discontinued to the pager receiver circuits for another 256 second time interval. In order to receive the signal that causes the pager receiver to be shut down for this extended amount of time, the pager receiver is turned on for a period long enough to detect at least a portion of the preamble followed by the inverted sync word. Generally, the timing between the encoder circuit of the system transmitted and the decoder circuit of the pager receiver is synchronized, thereby minimizing the decoder circuit "on time", especially the time between detection of the preamble and subsequent detection of the inverted sync code word. Consequently, sixty-four bits of the preamble codeword followed by the thirty-two bit inverted sync codeword, a total of ninety-six bits, provides sufficient information to ensure that a received transmission is valid. For a transmission rate of 512 bits per second, detecting ninety-six bits requires approximately 187 ms. Thus, a total of ninety-six bits of "on time" followed by 256 seconds of "off time" provides an off:on ratio of 1365:1.

The timing between the transmitter and the pager receiver is such that the pager receiver is activated in time to receive the last 64 bits of the preamble after an off period of 256 seconds. However, only 24 of those bits are necessary for preamble detection. If a pager receiver falsely detects a "perceived" preamble and the battery saver circuit stays actuated long enough to look for the sync code word, the result is additional battery drain. That is an acceptable condition. If a pager receiver falsely detects a perceived transmission call to shut down for 256 seconds, and a real call is sent out to that pager receiver during that time, that pager receiver will miss that call, an unacceptable condition.

Figure 3:
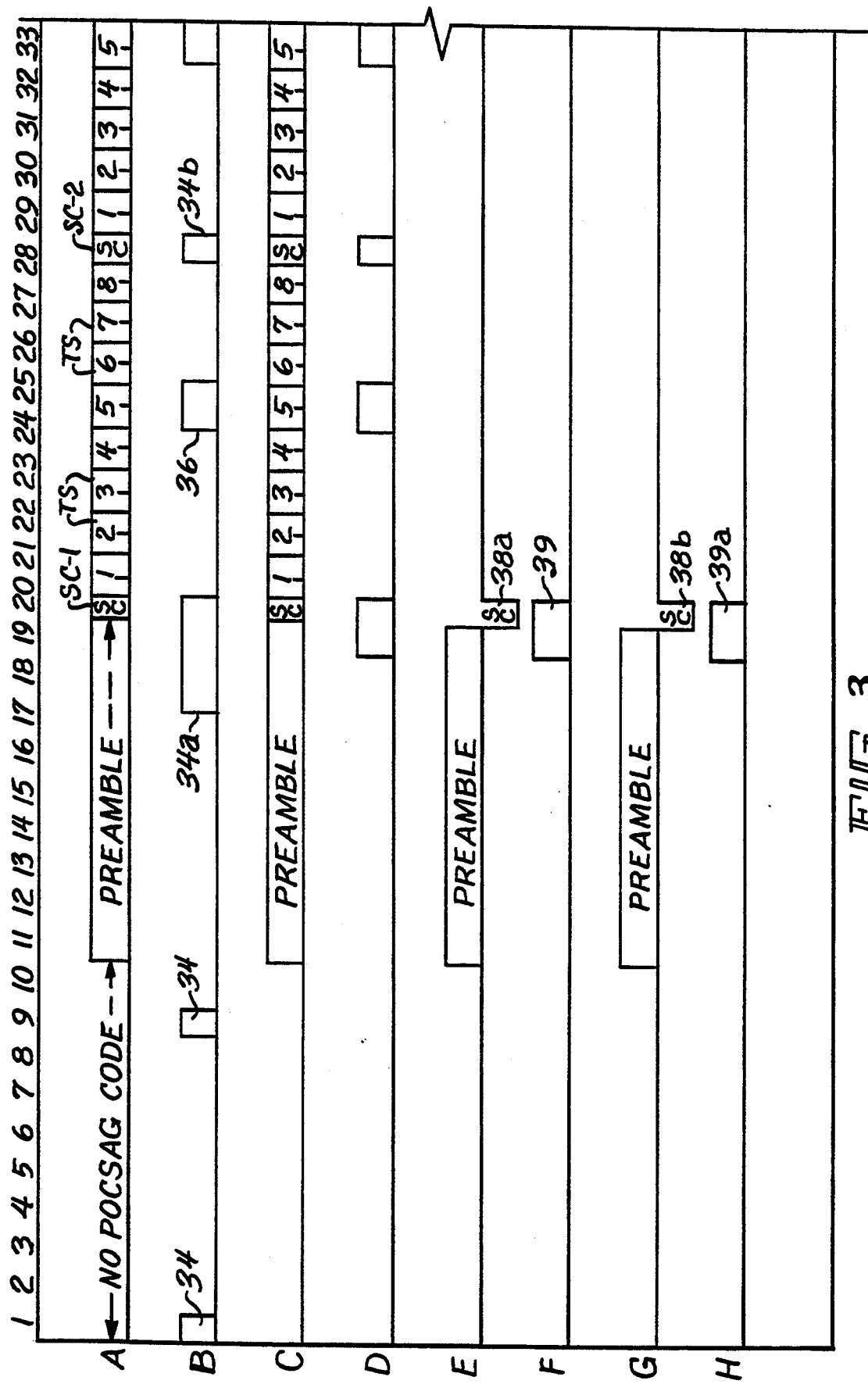

Referring to FIGS. 1, 3 and 3A, the manner in which the universal POCSAG code format is transmitted is illustrated in FIG. 3, line A. The POCSAG code includes a preamble which comprises 576 bits, and a plurality of batches, each including a thirty-two bit sync codeword followed by eight frames each comprised of two address/message codewords. Each address/message codeword comprises 32 bits. The conventional POCSAG decoder circuit 12 and battery saver circuit 14 respond to the coded signal to provide two different modes of battery saving operation. For reference purposes, a plurality of reference time slots 1-68 are indicated along the top portions of FIGS. 3 and 3A. The duration of each time slot is two codewords or one frame.

Referring to FIG. 3, line A, no POCSAG code is transmitted until halfway between reference time slots 10 and 11. At this point in time, the preamble is transmitted for at least 576 bits. Assuming that the preamble is transmitted for exactly 576 bits, preamble code transmission ceases exactly nine frames later. At this time, reference time slot 19½, a thirty-two bit synchronization codeword SC-1 is transmitted, followed by eight frames of two codewords each. At that time, if more address or message codewords are to be transmitted, they are preceded by another sync codeword SC-2. This process is repeated until all address and message codewords collected at the transmitter have been transmitted. At that time, reference time slot 45, transmission ceases and no POCSAG code is transmitted until more calls have been collected by the transmitter/encoder.

The battery saver pulses 34 of the standard POCSAG receiver, FIG. 3, line B are repeated often enough to enable the preamble detector circuit 18 to "catch" or latch onto the preamble when it is transmitted for the minimum duration of 576 bits. This is usually one time per second. For most POCSAG pager receivers, the on time duration is at least thirty-two bits or 62.5 milliseconds. When a preamble has not been detected by the preamble detector circuit 18 at the end of that period of time, the battery saver pulse terminates. When a battery saver pulse 34a occurs and the preamble is present, such as at reference time slot 17, the battery saver circuit 14 extends the duration of the battery saver pulse 34a to maintain power to the pager receiver to permit the sync codeword detector circuit 20 to detect the sync codeword which is always transmitted at the end of every preamble. Immediately upon detection of the sync codeword, the sync codeword detector circuit 20 enables the battery saver circuit 14 to discontinue power to the pager receiver circuits and transfer operation of the pager receiver to the second mode or level of battery saving. In this mode, power is applied to the pager receiver in response to battery saver pulse 36 only during the time slot assigned to the pager receiver. The time slot assigned to any receiver can be any one or more of the eight time slots, and each time slot (TS) is two codewords long. The time slot assigned to this pager receiver for purposes of illustration is time slot 5 (TS5), which begins at reference time slot 24 and ends at reference time slot 25.

A further battery saver pulse 34b occurs at reference time slot 28 and the sync codeword detector circuit 20 is enabled to process the incoming data to detect the sync codeword. If the sync codeword is present, the battery saver pulse is terminated until time slot TS5, reference time slot 32½, at which time the address/message codeword detector circuit 22 processes the incoming data to determine if the assigned address is being transmitted. This process continues until the end of the transmitted data, reference time slot 45. At this point, the sync codeword is not repeated and transmission ceases. A battery saver pulse 34c is generated at reference time slot 45, but because the sync codeword is not present, circuit operation reverts back to the first mode or level of battery saving. A battery saver pulse 34d is provided at reference time slot 53½ to enable the preamble detector circuit 18 to detect the next preamble codeword.

While the pager receiver is operating in the first battery saving level, the maximum off/on ratio is 16:1. While the pager receiver is operating in the second battery saving level, the maximum off/on ratio is 14:3.

Referring now to FIGS. 2, 3 and 3A, the manner in which the decoder circuit 12a according to the invention is operable to provide a third mode or operating level of battery saving is now described. The code signal transmission illustrated in FIG. 3, line C, corresponds to the conventional POCSAG code signal illustrated in FIG. 3, line A, except that an inverted sync codeword 38 is transmitted at the end of the last batch, enabling a pager receiver incorporating the decoder circuit 12a according to the present invention to operate in a third battery saver mode. This transmission occurs at reference time slot 45. The conventional POCSAG decoder circuit illustrated in FIG. 1 would not respond to this inverted sync codeword consequently, and such pager receiver would revert back to the first level of battery saving. In the improved circuit shown in FIG. 2, the inverted sync codeword is detected by the inverted sync codeword detector circuit 20a and the pager receiver begins operating in the third battery saver mode. The inverted sync codeword detector circuit 20a provides an input to the battery saver circuit 14a which responsively turns off power to the pager receiver for an extended amount of time, for example, 256 seconds. During this time the encoder/transmitter (not shown) can store or "collect" incoming calls and then transmit all of the stored calls in a relatively short amount of time during which pager receivers of the communication system receive the messages transmitted to the pager receivers. At the end of this short time, a further inverted sync codeword is transmitted, shutting down the pager receiver for yet another extended amount of time. FIG. 3, line D, illustrates the battery saver circuit 14a transferring pager receiver operation directly from the third mode battery saving to the second mode of battery saving and back to the third mode of battery saving at reference time slot 45½ when the inverted sync codeword is detected.

This third mode of battery saving is particularly useful at times when there are minimum numbers of signal transmissions, such as on weekends, late night or early morning, a substantially longer off/on ratio could be attained. For example, as shown in FIG. 3, line E, a preamble followed by an inverted sync codeword could be transmitted every 256 seconds. The timing between the encoder/transmitter and all the pager receivers of the system is synchronized such that the battery saver pulse becomes a logic high level just in time to "catch" the last sixty-four bits of the preamble. The battery saver pulse 39 stays at a logic high level long enough to enable the inverted sync codeword detector circuit 20a to detect the thirty-two bit inverted sync codeword 38a FIG. 3, lines E and F, reference time slot 20 and to discontinue power for 256 seconds. This is an off/on ratio of 1365:1.

FIG. 3, lines G and H illustrate the effect of a pager receiver going out of range, receiving a "dirty" signal, or where the transmitter shut down temporarily for some reason. In FIG. 3, lines G and H, at reference time slot 20, the inverted sync codeword 38b is shown having been transmitted by the transmitter, FIG. 3, line G, and received by the pager receiver which produces battery saver pulse 39a, FIG. 3, line H, and causing the pager receiver to be powered down for an extended amount of time. If the pager receiver were to then go out of range, the next series of calls would not be detectable by the pager receiver. The battery saver circuit 14 will still generate a battery saver pulse 39c (FIG. 3A) for the pager receiver at this time, but because a preamble cannot be detected due to the pager receiver being out of range, operation will revert back to the first mode of battery saving until such time as the pager receiver is again in range and receives a valid preamble. The foregoing illustration of the use of an inverted sync codeword in providing a third battery saving mode of operation for the pager receiver is presented with reference to preamble absence detection. However, the use of an inverted sync codeword can be employed in pager receivers which detect only preamble presence. In such application, the off:on time generally will be less than that obtainable when preamble absence detection is used.

Referring to FIG. 4, there is illustrated a block diagram of the preamble absence detector circuit 18a provided by the present invention. The preamble absence detector 18a includes a first comparator circuit 52, having two inputs 52a and 52b and an output 52c. The output 52c of the comparator circuit 52 is connected to the count input 54a of a first counter 54 which has a preset input 54b, an output 54c and a reset input 54d. A second comparator circuit 56 has inputs 56a and 56b and an output 56c. The output 56c of comparator circuit 56 is connected to the count input 58a of a second counter 58 which has a preset input 58b, an output 58c and a reset input 58d. The outputs 54c and 58c of counters 54 and 58 are connected to respective inputs 60a and 60b of a two input AND gate 60 which has an output 60c. The output 60c of AND gate 60 is connected to the reset inputs 54d, 58d and 62d of respective counters 54, 58 and 62.

The comparator circuits 56 and 52 compare the incoming data signal DATA received on conductor 61 with a simulated preamble signal SIM and its inverse $\overline{SIM}$. The simulated preamble signal SIM is generated by a third counter 62 and provided at an output 62a thereof. Counter 62 has a clock input 62b, an output 62c and a reset input 62d. Counter 62 has its output 62c connected to the reset inputs 54d and 58d of counters 54 and 58 and to its own reset input 62d. The clock input 62b of counter 62 is connected to a square wave source of 1024 pulses or bits per second, that is twice the rate of the data bits that comprise the incoming POCSAG code.

Counter 62 divides the rate of the data clock signal by two whereby the simulated preamble signal SIM is provided at a rate of 512 pulses or bits per second, the frequency of the bits of the incoming POCSAG code. The simulated preamble signal SIM is applied directly to input 56b of Comparator circuit 56, and through an inverter 64 to input 52b of comparator circuit 52.

In operation, comparator circuit 52 compares the inverted simulated preamble signal $\overline{SIM}$ with the incoming data signal DATA and produces an output pulse whenever these two signals, sampled near the midpoint of the data signal, are opposite in polarity. Counter 54 advances one step for each pulse generated by comparator circuit 52. A signal applied to the preset input 54b of counter 54 programs the number of required pulses before the counter 54 output changes state. By way of example, the counter circuit 54 is preset to count five pulses. The counter output changes state when five pulses are produced by comparator circuit 52, indicating a difference in polarity between the signals DATA and $\overline{SIM}$ applied to inputs of the comparator circuit 52 has been detected five times.

Comparator circuit 56 has the same two signal inputs as comparator circuit 52, except that the simulated preamble signal SIM is not inverted. The transitions of the data input are synchronized with the transitions of the simulated preamble signal SIM. Therefore, there are only two possible relative orientations for these signals to have. Comparator circuit 56 compares the simulated preamble signal SIM with the data input DATA. If the two signals are opposite in polarity, comparator circuit 56 generates a pulse that advances counter 58 one count. Counter 58 is identical to counter 54 and is preset to register five pulses before its output changes state.

When the outputs of both counter 54 and counter 58 have changed states this indicates that the two pairs of signals applied to the inputs of the two comparators 52 and 56 were opposite in phase for at least five bits of the incoming data signal relative to the simulated preamble signals. Accordingly, AND gate 60 is enabled, producing a preamble absence detection signal PAD. This signal PAD indicates that preamble is not present in the incoming data signal. The preamble absence detection signal PAD generated by AND gate 60 is applied to the battery saver circuit 14a (FIG. 2) to cause removal of power from the pager receiver circuits.

When the preamble portion of the incoming signal DATA, is present and out of phase with the inverted simulated preamble signal $\overline{SIM}$ at the input 52b of the circuit comparator 52, the output 52c pulses between logic high and logic low levels, providing a train of pulses or bits that are counted by counter 54. Counter 54 advances one count for each bit. Counter 58 does not advance at all and the signal at its output does not change state because the preamble is in phase with the simulated preamble SIM. When five bits are out of phase, the output of counter 54 changes state. However, because only one enabling signal is applied to AND gate 60 and thus, the AND gate 60 is not enabled because preamble absence has not been detected.

When the preamble portion of the incoming signal DATA is present and out of phase with the simulated preamble signal SIM at input 56b to comparator circuit 56, counter 58 then advances one count for each bit. Counter 54 does not advance at all because the preamble is in phase with the inverted simulated preamble $\overline{SIM}$. Therefore, only one enabling signal is applied to AND gate 60. Just as before, AND gate 60 is not enabled because a valid preamble is present.

Counter 62 is advanced one count every data bit and resets the counters 54 and 58, and itself, after N+M bits of the received signal compare with corresponding bits of either one of the simulated preamble signals, which in the present example is after N+M twenty-four data bits are received. Because data words in the POCSAG code format are thirty-two bits long, the common practice is to "look" for the preamble for a period of thirty-two bits (62.5 msec.). At the end of transmission of twenty-four bits, if all of three counters 54, 58 and 62 have not been reset by a preamble absence detection pulse PAD from AND gate 60, the counters are reset by the signal RESET generated by counter 62. If AND gate 60 generates the preamble absence detection signal PAD before counter 62 reaches a count of twenty-four, power is discontinued to the pager receiver circuits. If the signal RESET is produced by counter 62, this indicates presence of the preamble and the power is continued to the rest of the receiver circuits. When the signal RESET is produced by counter 62, the detection process is repeated and the power continues to be supplied as long as the signal RESET is being produced by counter 62. If the first and subsequent counter reset signals are produced by counter 62, and the last reset signal is produced by AND gate 60, then, the power is maintained to the receiver circuits for only a short "enable time" to allow the sync codeword detector circuit 20 or 20a of the decoder circuit 12a to detect the sync codeword or inverted sync codeword that immediately follows the preamble.

When digital noise is present on the data input, the counters 54 and 58 advance in a random fashion. Simple logic dictates the counters 54 and 58 never both advance on the same bit and at least one counter advances on every bit. Under such conditions, the AND gate 60 is enabled immediately as soon as it is possible to determine that the incoming data bit stream does not comprise a preamble. More specifically, the comparator circuits 52 and 56 generate a lack of parity signal, i.e. their outputs change state each time there is a polarity difference between the simulated preamble signal applied to respective inputs 52b and 56b and the incoming data signal DATA which is applied to their inputs 52a and 56a, respectively. The associated counters 54 and 58 advance with each positive going transition of the output of this associated comparator circuit.

Figure 5:
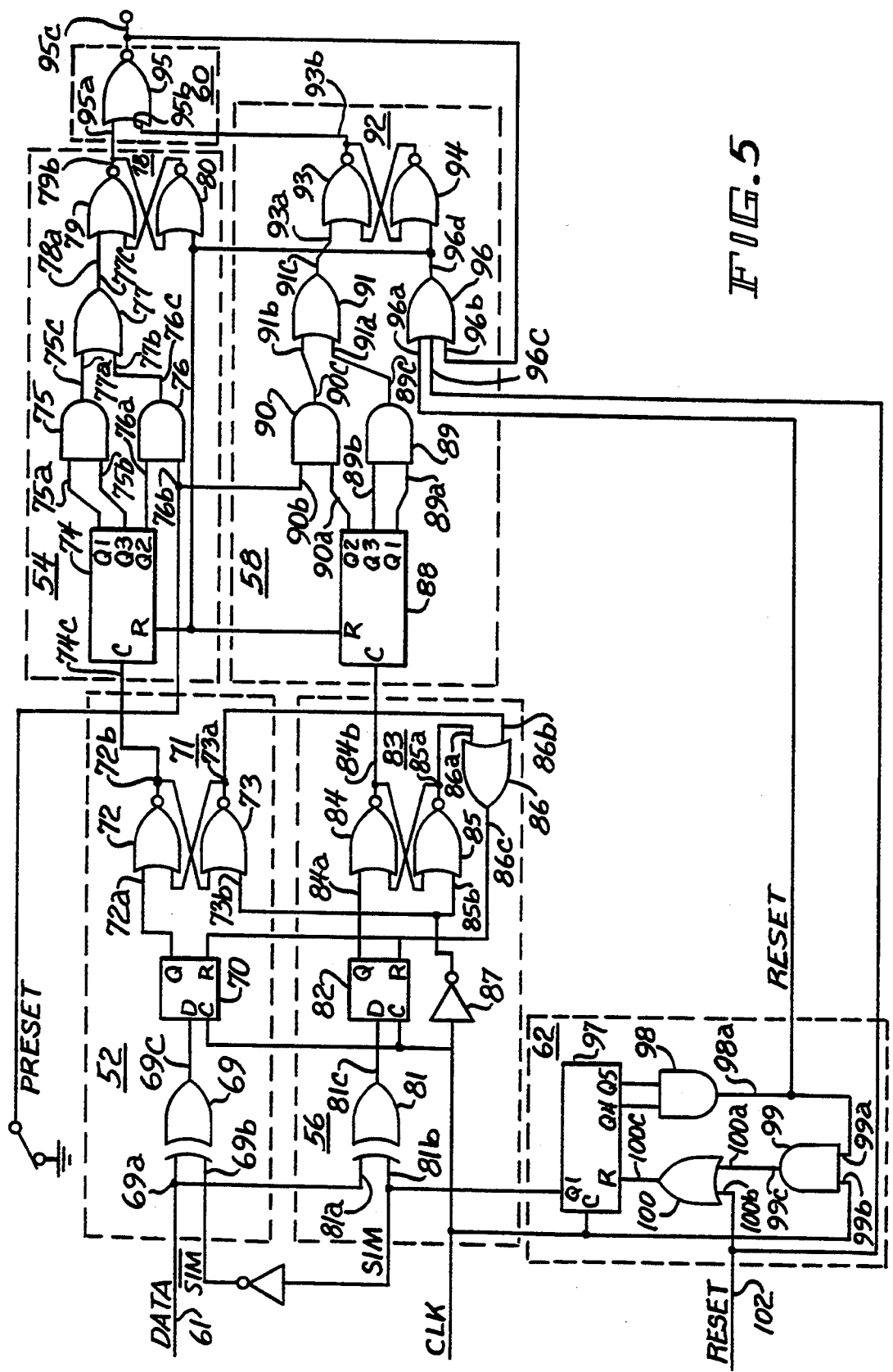
FIG. 5 is a schematic circuit diagram of the preamble absence detector circuit illustrated in FIG. 4.

Referring to FIG. 5, there is a schematic block diagram illustrating one embodiment for the preamble absence detector 18a illustrated in FIG. 4. Comparator 52 comprises an exclusive OR gate 69, a D flip flop, 70 and a latch circuit 71 formed by NOR gates 72 and 73.

The exclusive OR gate 69 has a first input 69a connected to conductor 61 to receive the input signal DATA and a second input 69b connected to the output of inverter 64 to receive the inverted simulated preamble signal $\overline{SIM}$. The output 69c of exclusive OR gate 69 is connected to the data input D of the flip flop 70, the output Q of which is connected to one input 72a of the latch circuit 71.

Counter 54 includes an eight bit counter 74, a pair of two input AND gates 75 and 76, an OR gate 77, and a latch circuit 78 formed by cross-connected NOR gates 79 and 80. Counter 74 has its clock input C connected to the output of the comparator circuit 52 at the output 71b of NOR gate 71. And gate 75 has its inputs 75a and 75b connected to outputs Q1–Q3 respectively of the counter 74 and its output 75c connected to one input 77a of OR gate 77. AND gate 76 has one of its inputs 76a connected to output Q2 of the counter 74, its second input 76b connected to the counter preset input, and an output 76c connected to a second input 77b of the OR gate 77, which has its output 77c connected to a set input of latch 78 at input 79a.

Comparator circuit 56 is similar to comparator 52 and includes an exclusive OR gate 81, a D flip flop 82, and a latch circuit 83 formed by cross-connected NOR gates 84 and 85. The exclusive OR gate 81 has a first input 81a connected to conductor 61 to receive the input signal DATA, a second input 81b connected to the output of counter 62 to receive the simulated preamble signal SIM, and an output 81c which is connected to the data input D of the flip flop 82. The output Q of the data flip flop 82 is connected to the set input of the latch circuit 83 at input 84a of NOR gate 84. The output 85a of NOR gate 85 is connected to one input 86a of an OR gate 86, which has a second input 86b connected to the output 73a of NOR gate 73 of the comparator circuit 52. The output 86c of gate 86 is commonly connected to RESET inputs R of flip flops 70 and 82.

The operation of flip flops 70 and 82 and latch circuits 71 and 83 is synchronized with the incoming data stream by a data clock signal CLK, the rate of which is twice the frequency of the incoming data signal DATA when it is the POCSAG preamble. The data clock signal CLK is synchronized with incoming data so as to have a negative transition whenever the data changes and to have a positive transition in the middle of the data bit. It is at the middle of the data bit that the data is sampled to determine its polarity. The clock signal CLK is applied to clock inputs C of flip flops 70 and 82 and through an inverter 87 to clock inputs of data latch circuits 71 and 83 at inputs 73b and 85b of NOR gates 73 and 85, respectively.

Counter 58 is similar to counter 54 and includes an eight bit counter 88, a pair of two input AND gates 89 and 90, a two input OR gate 91, and a data latch 92 formed by two cross-connected NOR gates 93 and 94. Counter 88 has its clock input C connected to the output of latch circuit 83 at the output 84b of NOR gate 84. AND gate 89 has one input 89a connected to output Q1 of counter 88 and a second input 89b connected to output Q3 of counter 88. The output 89c of AND gate 89 is connected to one input 91a of OR gate 91. AND gate 90 has one input 90a connected to output Q2 of counter 88, an input 90b connected to the counter preset input, and an output 90c connected to a second input 91b of OR gate 91 which has its output 91c connected to the set input of data latch 92 at input 93a of NOR gate 93.

The AND gate 60 is embodied by a two input NOR gate 95 which has one input 95a connected to the output of latch 78 at the output 79b of NOR gate 79. Gate 95 has a second input 95b connected to the output of latch 92 at the output 93b of NOR gate 93. The preamble absence detection signal PAD is produced at the output 95c of gate 95.

The counter 62 comprises a thirty-two bit counter 97, a pair of two input AND gates 98 and 99, and a two input OR gate 100. The counter 97 has its clock input C connected to receive the data clock signal CLK. The counter divides this data clock signal to produce the simulated preamble signal SIM at its output Q1 which is connected to input 81b of exclusive OR gate 81 and to the input of the inverter 64. Outputs Q4 and Q5 of counter 97 are combined by AND gate 98 to produce a signal RESET at output 98a of AND gate 98. The signal RESET is applied to one input 96a of a three input OR gate 96 which has a second input 96b connected to the output 95c of gate 95 to receive the preamble absence detection signal PAD. The OR gate 96 has a third input 96c connected to a system RESET input at conductor 102 which is reset upon initial power up of the receiver. The output 96d of the reset gate 96 is commonly connected to the reset inputs R of counters 74 and 88 and the reset inputs of latch circuits 78 and 92. The output of 98a of AND gate 98, which is associated with counter 97, is also connected to an input 99a of AND gate 99, which has a second input 99b connected to receive the data clock signal CLK. The output 99c of gate 99 is connected to one input 100a of OR gate 100 which has a second input 100b connected to the system RESET input 102. The output 100c of OR gate 100 is connected to the reset input R of counter 97.

Referring to FIG. 5 and the timing diagram of FIG. 6, a portion of a valid preamble of a transmitted signal DATA present on the data input 61 is shown in FIG. 6, line A. The data clock signal CLK is shown FIG. 6, line B. The simulated preamble signal SIM is shown in FIG. 6, line C. The inverted simulated preamble signal $\overline{SIM}$ is of the same frequency as, but opposite in polarity to signal SIM, that is, shifted in phase 180°. One of these signals SIM (or $\overline{SIM}$) is in phase with the signal DATA and the other signal $\overline{SIM}$ (or SIM) is out of phase with the signal DATA. In the example shown in FIG. 6, the signal SIM is in phase with the signal DATA. The outputs of exclusive OR gates 69 and 81, therefore, are out of phase with one another. The output of gate 69 is continuously at logic high level because the signals DATA and SIM at its two inputs are out of phase with each other. The output of gate 81 is continuously at logic low level because the signals DATA and SIM at its inputs are in phase with each other. The two D flip flops 70 and 82 transition whichever input is high to its output on the positive data clock CLK transition. Therefore, the output of D-flip flop 70 becomes logic high level and sets the latch 71. The D flip flop 70 is immediately reset by the output of the latch circuit through OR gate 86. Output 72b of the latch circuit is set negative FIG. 6, line D, on each positive data clock transition, and this negative going pulse clocks the associated counter 74.

The outputs Q1, Q3 and Q2 of counter 74 are combined by AND gates 75 and 76, and OR gate 77 to provide an output pulse at output 77c to set the latch circuit 78. The error programing input counter preset is set to a logic high level if the latch circuit is to be set on the second pulse to counter 74, and set to a logic low level if the latch circuit 78 is to be set on the fifth pulse to counter 74. The example illustrated in FIG. 6 is for an error programing input that is at a logic low level, so that the detector circuit will accept four errors and set the latch circuit 78 on the fifth pulse to counter 74.

The signals DATA and SIM which are applied to the inputs of exclusive OR gate 81 are of the same polarity. Therefore, the output of the gate 81 is continuously low, and the output of the associated D flip flop 82 is maintained at a logic low level and the output of latch 83 is maintained at a logic high level, FIG. 6, line E. Therefore, counter 88 is not clocked and the latch circuit 92 is not set. The output of latch circuit 92 is maintained at logic high level inhibiting gate 95, preventing the generation of the preamble absence detection signal PAD, and the output of gate 60 remains at a logic low level, FIG. 6, line H. When the inverted simulated preamble signal $\overline{SIM}$ is in phase with the preamble or data input signal DATA, the output of exclusive OR gate 81 becomes a logic high level instead of a logic low level, and the output of D flip flop 82 is pulsed high. Accordingly, the output of latch circuit 83 goes low. Thus, counter 88 is stepped and the latch circuit 92 is set. However, both latch circuits 78 and 92 must be set before gate 95 is enabled to generate the preamble absence detection signal PAD. As long as the preamble is present on the data input, only one of the two latch circuits 78 and 92 can be set.

When the preamble is present on the data input, counter 62 causes reset of the counters 74 and 88 and the latch circuits 78 and 92 by generating a reset signal RESET, FIG. 6, line I, after twenty-four data clock pulses CLK have been counted by the counter 62.

Referring now to FIG. 5 and to the timing diagram of FIG. 7, the following description illustrates the preamble absence detection process when noise is present on the data input 61. The data clock signal CLK is a 512 Hz square wave that is divided by two to provide the same two out of phase simulated preamble signals SIM and $\overline{SIM}$ (inverted) signals to the exclusive OR gates 81 and 69, respectively. The signals at the outputs of these exclusive OR gates 81 and 69 are 180° out of phase with one another, but they are no longer continuously high and continuously low, as is the case when a valid preamble is present. The signals at the outputs 69c and 81c are sampled by D flip flops 70 and 82 respectively, when the data clock signal CLK transitions from logic low to logic high. A pulse at a logic high level appears on the respective outputs of the D flip flops 70 and 82 when the input data, i.e., a noise signal in the present example, is out of phase with the simulated preamble SIM or its inverse $\overline{SIM}$ at the inputs of exclusive OR gates 81 and 69, respectively. These positive pulses set the respective latch circuits 71 and 83. The latch circuits 71 and 83, in turn, clock the binary counters 74 and 88, depending on the polarity of the noise signal at that particular positive transition of the data clock.

The error programing, for counters 74 and 88 is set to allow four errors and reject the fifth error. The input signal DATA FIG. 7, line A, is logic high at the first positive transition of the data clock signal CLK, FIG. 7, line B. The output of comparator 56 becomes logic low, FIG. 7, line E, so that counter 88 advances one count first, as represented by dashed block 1, FIG. 7, line G. The input signal DATA is still logic high level at the second positive transition of the data clock signal CLK, but the simulated data signal SIM FIG. 7, line C has changed state. The output of comparator 52 becomes logic low, FIG. 7, line D, and so the other counter 74 advances one count, as represented by dashed block 1, FIG. 7, line F. The input signal DATA changes to a logic low level, but changes back to logic a high level again just before the third positive transition of the data clock signal CLK, and so the output of comparator 56 becomes logic low and counter 88 advances one count. Counter 88 advances on the fourth positive data clock transition because the polarity of the noise on the data input 61 reverts back to a logic low level and so the output of comparator 56 becomes logic low. This process continues until both counters 74 and 88 have reached a count of five, and set their respective latch circuits 78 and 92. Counter 88 is set at the sixth clock signal CLK, FIG. 7, line G. Counter 74 is set at the eleventh clock signal CLK, FIG. 7, line F. In this particular example, eleven bits have been sampled before it is determined the data input is definitely not a preamble with less than five errors. At least ten bits minimum have to be sampled before a determination can be made and 75% of the time, more than the minimum number of bits must be sampled before it can be determined that a given data input is not a preamble.

When both counters 74 and 88 exceed four counts and set their respective latch circuits 78 and 92, gate 95 is enabled and generates the preamble absence detection signal PAD, FIG. 7, line H. As previously stated, when the preamble absence detection signal is provided, power to the pager receiver is discontinued for approximately one second. The preamble absence detection signal PAD resets the counters 74 and 88, FIG. 7, lines F and G, and counter 97, causing their outputs to become logic high levels.

We claim:

1. In a selectively addressable receiver having signal processing circuits for receiving an interrogation signal including a preamble signal having a predetermined code followed by at least one codeword, the combination comprising power saving circuit means for periodically applying a supply voltage to said signal processing circuits of the receiver, and preamble absence detecting means including first signal detecting circuit means responsive to a received signal to produce a first output signal whenever said received signal fails to have the predetermined code of said preamble signal, second signal detecting circuit means responsive to said received signal to produce a second output signal whenever said received signal fails to have the predetermined code of said preamble signal, signal combining circuit means responsive to said first and second output signals to provide a preamble absence detection signal indicating that the received signal fails to include the predetermined code of said preamble signal, said power saving circuit means responding to said preamble absence detection signal to terminate the supply voltage to said signal processing circuits of the receiver for a predetermined interval of time, said first signal detecting means including first comparing means for comparing said received signal with a first simulated preamble signal, and said second signal detecting means including second comparing means for comparing said received signal with a second simulated preamble signal, said preamble signal of said interrogation signal and said simulated preamble signals being coded to represent a plurality of binary bits occurring in a predetermined sequence, wherein said first and second simulated preamble signals have a 180° phase relationship to one another.

2. In a selectively addressable receiver having signal processing circuits for receiving an interrogation signal including a preamble signal having a predetermined code followed by at least one codeword, the combination comprising a power saving circuit for periodically applying a supply voltage to said signal processing circuits of the receiver, and preamble absence detecting means including first signal detecting circuit means responsive to a received signal to produce a first output signal whenever said received signal fails to have the predetermined code of said preamble signal, second signal detecting circuit means responsive to said received signal to produce a second output signal whenever said received signal fails to have the predetermined code of said preamble signal, signal combining circuit means responsive to said first and second output signals to provide a preamble absence detection signal indicating that the received signal fails to include the predetermined code of said preamble signal, said power saving circuit responding to said preamble absence detection signal to terminate the supply voltage to said signal processing circuits of the receiver for a predetermined interval of time, said first detecting means includes first comparing means for comparing said received signal with a first simulated preamble signal, and said second detecting means includes second comparing means for comparing said received signal with a second simulated preamble signal, said preamble signal of said interrogation signal and said simulated preamble signals are coded to represent a plurality of binary bits occurring in a predetermined sequence, said first signal detecting means produces said first output signal whenever N-bits of said received signal differ with corresponding bits of said first simulated preamble signal, where N is an integer greater than zero, and said second signal detecting means produces said second output signal whenever N-bits of said received signal differ with corresponding bits of said second simulated preamble signal wherein said first comparing means provides a wrong bit signal each time a bit of said received signal differs with the corresponding bit of said first simulated preamble signal, and said first signal detecting means includes first summing means for producing said first output signal whenever N wrong-bit signals are provided by said first comparing means, and wherein second comparing means provides a wrong bit signal each time a bit of said received signal differs with the corresponding bit of said second simulated preamble signal, and said second signal detecting means includes second summing means for producing said second output signal whenever N wrong-bit signals are provided by said second comparing means.

3. The receiver of claim 2, wherein said first and second summing means comprise first and second binary signal counters, respectively.

4. The receiver of claim 3, wherein said preamble absence detecting means includes reset means for resetting said first and second binary signal counters whenever N+M bits of said received signal compare with corresponding bits of either one of said simulated preamble signals, where M is an integer greater than zero.

5. In a selectively addressable receiver having signal processing circuits for receiving an interrogation signal including a preamble signal having a predetermined code followed by at least one codeword, the combination comprising power saving circuit means for periodically applying a supply voltage to said signal processing circuits of the receiver, and preamble absence detecting means including means for providing first and second simulated preamble signals having said predetermined code of said preamble signal of said interrogate signal and having a predetermined phase relationship to one another and to said preamble signal of said interrogate signal, signal detecting means responsive to a received signal and said simulated preamble signals for producing a preamble absence detection signal indicating that the received signal fails to include the predetermined code of said preamble signal, as soon as detection is made that the received signal fails to correspond to both of said simulated preamble signals, said power saving circuit means responds to said preamble absence detection signal to terminate the supply voltage to the signal processing circuits of the receiver for a predetermined interval of time.

6. The receiver of claim 5, wherein said preamble signal of said interrogation signal and said simulated preamble signals are coded to represent a plurality of binary bits occurring in a predetermined sequence.

7. The receiver of claim 6, wherein said detecting means includes first signal comparing means for producing a first signal whenever N-bits of said received signal differ with corresponding bits of said first simulated preamble signal, where N is an integer greater than zero, and second signal comparing means for producing a second signal whenever N-bits of said received signal differ with corresponding bits of said second simulated preamble signal and means responsive to said first and second signals for producing said preamble absence detection signal.

8. The receiver of claim 5, wherein said signal detecting means includes first comparing means for comparing said received signal with said first simulated preamble signal, and second comparing means for comparing said received signal with said second simulated preamble signal.

9. The receiver of claim 5, wherein said signal processing circuits include first synchronizing signal detecting means for detecting said synchronizing signal portion of said interrogation signal and second synchronizing signal detecting means for detecting the inverse of said synchronizing signal portion of said interrogation signal and producing a control output signal for causing said power saving circuit to terminate the supply voltage to the signal processing circuits of the receiver for an interval of time substantially greater than said predetermined interval of time.

10. In a selectively addressable receiver having signal processing circuits for receiving an interrogation signal including a preamble signal having a predetermined code followed by at least one codeword, the combination comprising a power saving circuit for periodically applying a supply voltage to said signal processing circuits of the receiver, and preamble absence detecting means including means for providing first and second simulated preamble signals having a predetermined phase relationship to one another, signal detecting means responsive to a received signal and said simulated preamble signals for producing a preamble absence detection signal indicating that the received signal fails to include the predetermined code of said preamble signal as soon as detection is made that the received signal fails to correspond to both of said simulated preamble signals, said power saving circuit responding to said preamble absence detection signal to terminate the supply voltage to the signal processing circuits of the receiver for a predetermined interval of time, said preamble signal of said interrogation signal and said simulated preamble signals are coded to represent a plurality of binary bits occurring in a predetermined sequence, said detecting means includes first and second signal comparing means, said first signal comparing means producing a first signal whenever N-bits of said received signal differ with corresponding bits of said first simulated preamble signal, where N is an integer greater than zero, and said second signal comparing means producing a second signal whenever N-bits of said received signal differ with corresponding bits of said second simulated preamble signal and means responsive to said first and second signals for producing said preamble absence detection signal, wherein said first signal comparing means includes a first signal comparing circuit which provides a wrong bit signal each time a bit of said received signal differs with the corresponding bit of said first simulated preamble signal, and first summing means for producing said first signal in response to N wrong-bit signals, and said second comparing means includes a second signal comparing circuit which provides a wrong-bit signal each time a bit of said received signal differs with the corresponding bit of said second simulated preamble signal, and second summing means for producing said second output signal in response to N wrong-bit signals.

11. The receiver of claim 10, wherein said first and second summing means comprise first and second binary signal counters, respectively.

12. The receiver of claim 11, wherein said preamble absence detecting means includes reset means for resetting said first and second binary signal counters whenever N+M bits of said received signal compare with corresponding bits of either one of said simulated preamble signals, where M is an integer greater than zero.

13. In a selectively addressable receiver having signal processing circuits for receiving an interrogation signal including a preamble signal followed by at least one codeword, said preamble signal being coded to represent a plurality of binary bits occurring in a predetermined sequence, the combination comprising power saving circuit means for periodically applying a supply voltage to said signal processing circuits, and preamble absence detecting means including means for providing first and second simulated preamble signals, each of said simulated preamble signals being binary coded signals having bits occurring in said predetermined sequence for the bits of said preamble signal, said first and second simulated preamble signals having a predetermined phase relationship to one another and to said preamble signal of said interrogate signal, first signal comparing means responsive to a received signal and said first simulated preamble signal to produce a first output signal whenever N-bits of said received signal fail to compare with corresponding bits of said first simulated preamble signal, where N is an integer greater than zero, second signal comparing means responsive to said received signal and said second simulated preamble signal to produce a second output signal whenever N-bits of said received signal fail to compare with corresponding bits of said second simulated preamble signal, signal combining circuit means responsive to said first and second output signals to provide a preamble absence detection signal indicating that the received signal fails to include the preamble signal, said power saving circuit means responding to said preamble absence detection signal to terminate the supply voltage to said signal processing circuits of the receiver for a predetermined interval of time.

14. In a selectively addressable receiver having signal processing circuits for receiving an interrogation signal including a preamble signal followed by at least one codeword, said preamble signal being coded to represent a plurality of binary bits occurring in a predetermined sequence, the combination comprising a power saving circuit for periodically applying a supply voltage to said signal processing circuits, and preamble absence detecting means including means for providing first and second simulated preamble signals, each of said simulated preamble signals being binary coded signals having bits occurring in said predetermined sequence for the bits of said preamble signal, said first and second simulated preamble signals having a predetermined phase relationship to one another, first signal comparing means responsive to a received signal and said first simulated preamble signal to produce a first output signal whenever N-bits of said received signal differ with corresponding bits of said first simulated preamble signal, where N is an integer greater than zero, second signal comparing means responsive to said received signal and said second simulated preamble signal to produce a second output signal whenever N-bits of said received signal differ with corresponding bits of said second simulated preamble signal, signal combining circuit means responsive to said first and second output signals to provide a preamble absence detection signal indicating that the received signal fails to include the preamble signal, said power saving circuit responding to said preamble absence detection signal to terminate the supply voltage to said signal processing circuits of the receiver for a predetermined interval of time, wherein said first signal comparing means includes a first signal comparing circuit which provides a wrong-bit signal each time a bit of said received signal differs with the corresponding bit of said first simulated preamble signal, and first binary signal counting means for counting the number of wrong-bit signals provided by said first signal comparing circuit and producing said first signal when N wrong-bit signals have been provided, and said second comparing means includes a second signal comparing circuit which provides a wrong-bit signal each time a bit of said received signal differs with the corresponding bit of said second simulated preamble signal, and second binary signal counting means for counting the number of wrong-bit signals provided by said second signal comparing circuit and producing said second output signal when N wrong-bit signals have been provided.

15. The receiver of claim 14, wherein said preamble absence detecting means includes reset means for resetting said first and second binary signal counters whenever N+M bits of said received signal compare with corresponding bits of either one of said simulated preamble signals, where M is an integer greater than zero.

16. In a selectively addressable receiver having signal processing circuits for receiving an interrogation signal including a preamble signal having a predetermined code followed by one or more batches of a predetermined time duration and each batch including a synchronizing signal and a plurality of information signals, said signal processing circuits processing a received signal and producing a processed signal including the code of said preamble signal, and first synchronizing signal detecting means responsive to the synchronizing signal to synchronize the operation of the receiver, the combination comprising power saving circuit means for periodically providing a supply voltage to render said signal processing circuits operative to process the received signal, and absence detecting means having an input coupled to said signal processing circuits and having an output coupled to said power saving circuit means, said absence detecting means including means for detecting whether or not said processed signal includes the predetermined code of said preamble signal and for terminating the supply voltage as soon as detection is made that said processed signal does not include said predetermined code, and second synchronizing signal detecting means responsive to an inverted synchronizing signal which is the complement of said synchronizing signal for causing the power saving circuit means to deactivate the signal processing circuits of the receiver for an interval of time that is greater than the duration of one of said batches.

17. In a selectively addressable receiver having signal processing circuits for receiving an interrogation signal including a preamble signal having a predetermined code followed by one or more batches of a predetermined time duration and each batch including a synchronizing signal and a plurality of address signals, the signal processing circuits including first synchronizing signal detecting means, address means, and power saving circuit means including timing means for operating the signal processing circuits in a power saving mode in which the signal processing circuits are activated periodically for a time interval of a predetermined duration for detecting the preamble signal and the synchronizing signal, the first synchronizing signal detecting means being responsive to a synchronizing signal to cause the power saving circuit means to deactivate the signal processing circuits and subsequently reactivate the signal processing circuits at a preselected time following the occurrence of the synchronizing signal for enabling the address means to respond to address signals, the combination comprising preamble absence detecting means responsive to a received signal for producing a preamble absence detection signal whenever the received signal fails to include the predetermined coding of said preamble signal, the power saving circuit means responding to said preamble absence detection signal to deactivate the signal processing circuits of the receiver for a predetermined interval of time, and in the absence of said preamble absence detection signal, the power saving circuit means maintaining the signal processing circuits activated for detecting the synchronizing signal, and second synchronizing signal detecting means responsive to an inverted synchronizing signal which is the complement of said synchronizing signal for causing the power saving circuit means to deactivate the signal processing circuits of the receiver for an interval of time substantially greater than the interval of time of one of said batches.

18. The receiver of claim 17, wherein the inverted synchronizing signal is transmitted following the address signals.

19. The receiver of claim 17, wherein the inverted synchronizing signal is transmitted following the preamble signal.

20. The receiver of claim 17, wherein said preamble absence detecting means includes means for providing first and second simulated preamble signals having a predetermined phase relationship to one another, and signal detecting means responsive to a received signal and said simulated preamble signals for producing said preamble absence detection signal whenever the received signal fails to correspond to both of said simulated preamble signals.

21. In a selectively addressable receiver having signal processing circuits for receiving an interrogation signal including a preamble signal followed by a synchronizing signal and a plurality of address signals, said signal processing circuits including preamble detecting means, first synchronizing signal detecting means, address signal detecting means, and power saving circuit means including timing means for operating the signal processing circuits in a first power saving mode in which the signal processing circuits are activated periodically for a given time interval of a predetermined duration for detecting the preamble signal and the synchronizing signal, the first synchronizing signal detecting means upon detecting a synchronizing signal causing the power saving circuit means to operate the signal processing circuits in a second power saving mode in which the signal processing circuits are deactivated and subsequently reactivated at a preselected time following the occurrence of the synchronizing signal for enabling the address signal detecting means to detect address signals, the improvement comprising a second synchronizing signal detecting means for detecting an interrogate signal including a preamble signal followed by an inverted synchronizing signal which is the complement of the synchronizing signal and responsively producing a power-down signal, the power saving circuit means responding to said power-down signal to cause the signal processing circuits to operate in a third power saving mode in which the signal processing circuits are maintained deactivated for a time interval which is substantially greater than said predetermined time interval and subsequently are reactivated periodically for detecting said interrogate signal and said signal processing circuits responding to the detection of at least a portion of said preamble signal followed immediately by said inverted synchronizing signal to produce a further power-down signal, the power saving circuit means maintaining the signal processing circuits operating in said third power saving mode as long as said further synchronizing signal detecting means continues to detect at least a portion of said preamble signal followed immediately by an inverted synchronizing signal each time the signal processing circuits are reactivated when operating in said third power saving mode, and the power saving circuit means causing the operation of the signal processing circuits to revert to said first power saving mode if said second synchronizing signal detecting means fails to detect an inverted synchronizing signal when the signal processing circuits are reactivated when operating in said third power saving mode.

22. The receiver of claim 21, wherein the power saving circuit means causes the operation of the signal processing circuits to revert to said second power saving mode for detecting address signals in response to the detection of a synchronizing signal by the first synchronizing signal detecting means while the signal processing circuits are operating in said third power saving mode.

23. The receiver of claim 22, wherein the power saving circuit means causes the operation of the signal processing circuits to revert from said second power saving mode to said third power saving mode in response to the detection of an inverted synchronizing signal which is received after said address signals have been detected.

24. The receiver of claim 21, wherein an inverted synchronizing signal is transmitted immediately following the address signals to cause the signal processing circuits to operate in said third power saving mode.

25. The receiver of claim 24, wherein an inverted synchronizing signal is transmitted immediately following the preamble signal to maintain the signal processing circuits operating in said third power saving mode.

26. The receiver of claim 25, wherein said preamble signal, said synchronizing signal and said inverted synchronizing signal each are coded to represent a plurality of binary bits occurring in a predetermined sequence, and wherein the power saving circuit reactivates the signal processing circuits at a predetermined time following the detection of said inverted synchronizing signal whereby the preamble detecting means is enabled to detect only a portion, corresponding to N-bits, of the preamble signal which immediately precedes a subsequently received inverted synchronizing signal.

27. The receiver of claim 25, wherein the preamble detecting means includes means for producing an output signal for indicating that N-bits of the preamble signal of a received signal have been detected, and said power saving circuit means responding to said output signal to maintain the signal processing circuits activated for detecting said subsequently received inverted synchronizing signal.

28. The receiver of claim 21, wherein the power saving circuit means deactivates the signal processing circuits before the end of said predetermined time interval whenever the preamble detecting means fails to detect a preamble signal.

29. The receiver of claim 21, wherein the ratio of the time that the signal processing circuits are deactivated to the time that the signal processing circuits are activated is in the range of 1350 to 1365.

30. In a selectively addressable receiver having signal processing circuits for receiving an interrogation signal including a preamble signal coded to represent an N-bit binary signal followed by a synchronizing signal coded to represent an M-bit binary signal and a plurality of address signals each coded to represent a multi-bit binary signal, said signal processing circuits including preamble detecting means, synchronizing signal detecting means, address signal detecting means, and power saving circuit means including timing means for operating the signal processing circuits in a first power saving mode in which the signal processing circuits are activated periodically for a given time interval of a predetermined duration for detecting the preamble signal and the synchronizing signal, and a second power saving mode in which the signal processing circuits are deactivated and subsequently reactivated at a preselected time following the occurrence of the synchronizing signal for detecting address signals, the improvement comprising a further synchronizing signal detecting means for responding to an M-bit binary signal which is received immediately following said address signals and which represents an inverted synchronizing signal for causing the power saving circuit means to operate the signal processing circuits in a third power saving mode in which the signal processing circuits are maintained deactivated for a time interval substantially greater than said predetermined time interval and thereafter reactivated periodically for detecting an interrogate signal, said signal processing circuits responding to detection of at least a portion of the N-bit preamble signal followed immediately by an M-bit inverted synchronizing signal for maintaining said signal processing circuits operating in said third mode.

31. The receiver of claim 30, wherein the power saving circuit means causes the operation of the signal processing circuits to revert to said first mode whenever said further synchronizing signal detecting means fails to detect an M-bit binary signal representing an inverted synchronizing signal when the signal processing circuits are rectivated when operating in said third power saving mode.

32. The receiver of claim 30, wherein the power saving circuit means causes the operation of the signal processing circuits to revert directly to said second power saving mode for detecting address signals in response to the detection of an M-bit synchronizing signal by the synchronizing signal detecting means while the signal processing circuits are operating in said third power saving mode.

33. The receiver of claim 32, wherein the power saving circuit means causes the operation of the signal processing circuits to revert from said second power saving mode directly to said third power saving mode in response to the detection of an M-bit inverted synchronizing signal which is received after said address signals have been detected.

34. In a selectively addressable receiver having signal processing circuits for receiving an interrogation signal having a predetermined code followed by a synchronizing signal, said signal processing circuits processing a received signal and producing a processed signal including the code, and synchronizing means responsive to the synchronizing signal to synchronize the operation of the receiver, the combination comprising a power saving circuit for periodically providing a supply voltage to render said signal processing circuits operative to process the received signal, and absence detecting means having an input coupled to said signal processing circuits and having an output coupled to said power saving circuit, said absence detecting means including means for detecting whether or not said processed signal includes the predetermined code of said preamble signal and for terminating the supply voltage as soon as detection is made that said processed signal does not include said predetermined code, and a further synchronizing signal detecting means responsive to a synchronizing signal which is the complement of said synchronizing signal for causing the power saving circuit to deactivate the signal processing circuits of the receiver for an interval of time.

35. In a selectively addressable receiver having signal processing circuits for receiving an interrogation signal including a preamble signal having a predetermined code followed by one or more batches of a predetermined time duration and each batch including a synchronizing signal and a plurality of information signals, said signal processing circuits processing a received signal and producing a processed signal including the code, and synchronizing signal detecting means responsive to the synchronizing signal to synchronize the operation of the receiver, the combination comprising a power saving circuit for periodically providing a supply voltage to render said signal processing circuits operative to process the received signal, and absence detecting means having an input coupled to said signal processing circuits and having an output coupled to said power saving circuit, said absence detecting means including means for detecting whether or not said processed signal includes the predetermined code and for terminating the supply voltage as soon as detection is made that said processed signal does not include said predetermined code, and further synchronizing signal detecting means responsive to an inverted synchronizing signal which is the complement of said synchronizing signal for causing the power saving circuit to deactivate the signal processing circuits of the receiver for an interval of time that is greater than the duration of one of said batches.

36. In a selectively addressable receiver having signal processing circuits for receiving an interrogation signal including a preamble signal having a predetermined code followed by one or more batches of a predetermined time duration and each batch including a synchronizing signal and a plurality of information signals, said signal processing circuits processing a received signal and producing a processed signal including the code, and synchronizing signal detecting means responsive to the synchronizing signal to synchronize the operation of the receiver, the combination comprising a power saving circuit for periodically providing a supply voltage to render said signal processing circuits operative to process the received signal, and absence detecting means having an input coupled to said signal processing circuits and having an output coupled to said power saving circuit, said absence detecting means including means for detecting whether or not said processed signal includes the predetermined code of said preamble signal and for terminating the supply voltage as soon as detection is made that said processed signal does not include said predetermined code, and further synchronizing signal detecting means responsive to a synchronizing signal which is the complement of said synchronizing signal for causing the power saving circuit to deactivate the signal processing circuits of the receiver for an interval of time that is greater than the duration of one of said batches.

37. A method for providing a battery saving function for a battery powered personal communications receiver which receives an interrogation signal including one or more batches of a predetermined time duration, each batch including a synchronizing signal and a plurality of coded message information signals, the receiver being powered during a first periodically occurring time interval of a predetermined duration for receiving synchronizing signals, and during at least one time interval of a plurality of additional predetermined time intervals following the occurrence of the synchronizing signal and to which the receiver is assigned, for receiving coded message information signals, said method comprising the steps of applying power to said receiver to enable said receiver to receive synchronizing signals including a first coded synchronizing signal that is generated and transmitted to said receiver when coded message information signals are to be transmitted in at least one of the plurality of additional time intervals and a second coded synchronizing signal that is generated and transmitted to said receiver in place of the first synchronizing signal when coded information message signals are not to be transmitted in any of the plurality of additional time intervals;

maintaining said receiver in synchronization with the system when either the first or second synchronizing signals are received by said receiver; and suspending the supply of power to the receiver immediately following the receipt of the second synchronizing signal, whereby the supply of power to the receiver is suspended for an extended interval of time during which coded information message signals are not to be transmitted, the duration of said extended interval of time being greater than the duration of one batch.

38. A personal communications receiver which receives an interrogation signal including one or more batches of a predetermined time duration, each batch including a synchronizing signal and a plurality of coded message information signals, said receiver being powered during a first periodically occurring time interval of a predetermined duration for receiving synchronizing signals, and during at least one time interval of a plurality of additional predetermined time intervals following the synchronizing signal and to which the receiver is assigned for receiving coded message information signals, a first coded synchronizing signal being transmitted when coded message information signals are to be transmitted in at least one of the plurality of additional predetermined time intervals, and a second coded synchronizing signal being transmitted in place of said first synchronizing signal when coded message information signals are not to be transmitted in any of the plurality of additional time intervals, said receiver comprising battery powered signal receiver circuits for receiving and detecting the transmitted coded synchronizing and coded message information signals, means responsive to said received coded synchronizing signals for maintaining receiver synchronization, and power saving circuit means for supplying power to said receiver for the additional time interval for receiving coded message information signals when the first synchronizing signal is received, and for suspending the supply of power to said receiver for an extended interval of time when said second synchronizing signal is received, said extended interval of time being greater than the duration of one batch.

* * * * *